(12) United States Patent
Fang et al.

(10) Patent No.: US 11,412,070 B2
(45) Date of Patent: Aug. 9, 2022

(54) METHOD AND APPARATUS FOR GENERATING INFORMATION

(71) Applicant: BEIJING BAIDU NETCOM SCIENCE AND TECHNOLOGY CO., LTD., Beijing (CN)

(72) Inventors: Xiaomin Fang, Beijing (CN); Yaxue Chen, Beijing (CN); Lihang Liu, Beijing (CN); Lingke Zeng, Beijing (CN); Fan Wang, Beijing (CN); Jingzhou He, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/891,822

(22) Filed: Jun. 3, 2020

(65) Prior Publication Data
US 2021/0194977 A1 Jun. 24, 2021

(30) Foreign Application Priority Data
Dec. 24, 2019 (CN) .......................... 201911347297.8

(51) Int. Cl.
*H04L 67/50* (2022.01)
*G06N 5/04* (2006.01)
(Continued)

(52) U.S. Cl.
CPC .............. *H04L 67/55* (2022.05); *G06N 5/04* (2013.01); *G06N 20/00* (2019.01); *G06Q 10/04* (2013.01);
(Continued)

(58) Field of Classification Search
CPC ......... H04L 67/26; H04L 67/22; G06N 20/00; G06N 5/04; G06Q 10/04; G06Q 10/10; G06Q 30/0282
(Continued)

(56) References Cited

U.S. PATENT DOCUMENTS

2012/0317064 A1* 12/2012 Hagiwara .......... G06Q 30/0201
706/46
2014/0172544 A1* 6/2014 Rabkin .................. G06Q 50/01
705/14.44
(Continued)

FOREIGN PATENT DOCUMENTS

| CN | 106878397 A | 6/2017 |
|---|---|---|
| CN | 106961362 A | 7/2017 |

(Continued)

OTHER PUBLICATIONS

Chinese Office Action for Chinese Application No. 201911347297. 8, dated Jan. 29, 2022, 9 pages.
(Continued)

*Primary Examiner* — Tauqir Hussain
(74) *Attorney, Agent, or Firm* — Seed IP Law Group LLP (57) ABSTRACT

Embodiment of the disclosure provide a method and apparatus for generating information. The method includes: acquiring vectors of a plurality of users, the vector being used to characterize behavior habits of the users; inputting the vectors of the plurality of users and push information pushed by a push system to the plurality of users into a feedback information generating model established in advance, to generate the feedback information of the plurality of users for the push information, wherein the feedback information generating model is used to characterize a corresponding relationship between the vectors, the push information and the feedback information; and generating an
(Continued)

evaluation report of the push system based on the feedback information.

11 Claims, 4 Drawing Sheets

(51) Int. Cl.
    *H04L 67/55*       (2022.01)
    *G06Q 10/10*       (2012.01)
    *G06N 20/00*       (2019.01)
    *G06Q 10/04*       (2012.01)
    *G06Q 30/02*       (2012.01)

(52) U.S. Cl.
    CPC ......... *G06Q 10/10* (2013.01); *G06Q 30/0282* (2013.01); *H04L 67/535* (2022.05)

(58) Field of Classification Search
    USPC ......................................................... 709/206
    See application file for complete search history.

(56) References Cited

U.S. PATENT DOCUMENTS

2014/0351179 A1* 11/2014 Li ............................ H04L 51/32
                                                              706/12
2015/0044654 A1* 2/2015 Lendvay ................. G09B 23/28
                                                               434/262
2015/0339588 A1* 11/2015 Cardonha .............. G06N 20/00
                                                                 706/11
2016/0307131 A1* 10/2016 Wang ............... G06Q 10/06311
2017/0171336 A1* 6/2017 Yin ........................ H04L 67/306
2017/0178527 A1* 6/2017 Srinivasan Natesan . G09B 5/02
2017/0300944 A1* 10/2017 Wilkinson .......... G06Q 30/0203
2018/0285730 A1* 10/2018 Zhao ...................... G06N 5/022
2019/0236488 A1    8/2019 Achan et al.
2020/0050527 A1* 2/2020 Jones .................... G06F 3/0482
2020/0211407 A1* 7/2020 Bushell ............. G06Q 10/0639
2021/0194977 A1* 6/2021 Fang ...................... G06N 20/00

FOREIGN PATENT DOCUMENTS

| CN | 108255886 A | 7/2018 |
|---|---|---|
| CN | 109522483 A | 3/2019 |
| CN | 110335100 A | 10/2019 |
| JP | 2014-235468 A | 12/2014 |
| JP | 2019-144916 A | 8/2019 |

OTHER PUBLICATIONS

Japanese Office Action for Japanese Application No. 2020-098532, dated Jan. 4, 2022, 5 pages.

* cited by examiner

METHOD AND APPARATUS FOR GENERATING INFORMATION

CROSS-REFERENCE TO RELATED APPLICATIONS

This application claims priority to Chinese Patent Application No. 201911347297.8, filed on Dec. 24, 2019, titled "Method and apparatus for generating information," which is hereby incorporated by reference in its entirety.

TECHNICAL FIELD

Embodiments of the present disclosure relate to the field of computer technology, and more particularly, to a method and apparatus for generating information.

BACKGROUND

A push technology refers to a technology that a server actively sends information to a client. The push technology has various forms of information expressions such as a short message, an e-mail, a Web page, a window, and the like. Content includes advertisement, news, and recommended content. With the development of communication technology, pushing advertising and actively recommending services and services to user terminals are increasingly becoming the main means for operators to conduct advertising marketing and traffic management.

However, the current push system performs evaluating in the following way: A. no evaluation is performed offline, and a flow test is performed directly online to observe the user's real feedback. B. Evaluation is performed according to some general evaluation criteria before going online. These approaches cannot accurately evaluate the push system.

SUMMARY

Embodiments of the present disclosure provide a method and apparatus for generating information.

According to a first aspect, an embodiment of the present disclosure provides a method for generating information, including: acquiring vectors of a plurality of users, the vector being used to characterize behavior habits of the users; inputting the vectors of the plurality of users and push information pushed by a push system to the plurality of users into a feedback information generating model established in advance, to generate the feedback information of the plurality of users for the push information, wherein the feedback information generating model is used to characterize a corresponding relationship between the vectors, the push information and the feedback information; and generating an evaluation report of the push system based on the feedback information.

In some embodiments, the acquiring vectors of a plurality of users includes: for each user, acquiring historical behavior data of the user; and processing the historical behavior data to obtain a vector of the user.

In some embodiments, the method further includes optimizing the push system based on the evaluation report.

In some embodiments, the feedback information generating model is trained by: acquiring a training sample set, the training sample set including vectors of users, historical information pushed to the users, and historical feedback information of the users for the historical information; and using the vectors of the users and the history information as an input, using the history feedback information as an expected output, and training to obtain the feedback information generating model.

According to a second aspect, an embodiment of the present disclosure provides an apparatus for generating information, including: a vector acquisition unit configured to acquire vectors of a plurality of users, the vectors being used to characterize behavior habits of the users; an information generating unit configured to input the vectors of the plurality of users and push information pushed by a push system to the plurality of users into a feedback information generating model established in advance to generate the feedback information of the plurality of users for the push information, the feedback information generating model being used to characterize a corresponding relationship between the vectors, the push information, and the feedback information; and a report generating unit configured to generate an evaluation report of the push system based on the feedback information.

In some embodiments, the vector acquisition unit is further configured to: for each user, acquire historical behavior data; process the historical behavior data to obtain a vector of the user.

In some embodiments, the apparatus further comprises a system optimizing unit configured to optimize the push system based on the evaluation report.

In some embodiments, the apparatus further includes a training unit configured to acquire a training sample set, the training samples including vectors of users, historical information pushed to the users, and historical feedback information of the users for the historical information; use the vectors of the users and the history information as an input, use the history feedback information as an expected output, and train to obtain the feedback information generating model.

According to a third aspect, an embodiment of the present disclosure provides an electronic device including one or more processors; and a storage apparatus storing one or more programs, where the one or more programs, when executed by the one or more processors, cause said one or more processors to implement the method as described in any of the embodiments in the first aspect.

According to a fourth aspect, an embodiment of the present disclosure provides a computer readable medium, storing a computer program thereon, where the program, when executed by a processor, implements the method as described in any of the embodiments in the first aspect.

According to the method and apparatus for generating information provided in the above embodiments of the present disclosure, first, a plurality of vectors of a user may be acquired, the vectors being used to represent behavior habits of the users. Then, the plurality of vectors and the push information pushed by a push system to the plurality of users are input into a feedback information generating model established in advance, and the feedback information of the plurality of users for the push information is generated. Finally, an evaluation report of the push system is generated based on the feedback information. According to the method of the present embodiment, the push system may be evaluated according to the feedback information generated by the simulation, so that the evaluation accuracy of the push system is improved, and the cost is saved at the same time.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION

The present disclosure is described in further detail below with reference to the accompanying drawings and examples. It should be understood that specific embodiments described herein are merely illustrative of the related invention and are not restrictive of the invention. It should be also noted that, for ease of description, only parts related to the invention are shown in the drawings.

It should be noted that the embodiments in the present disclosure and the features in the embodiments may be combined with each other without conflict. The present disclosure will now be described in detail with reference to the accompanying drawings and examples.

Figure 1:
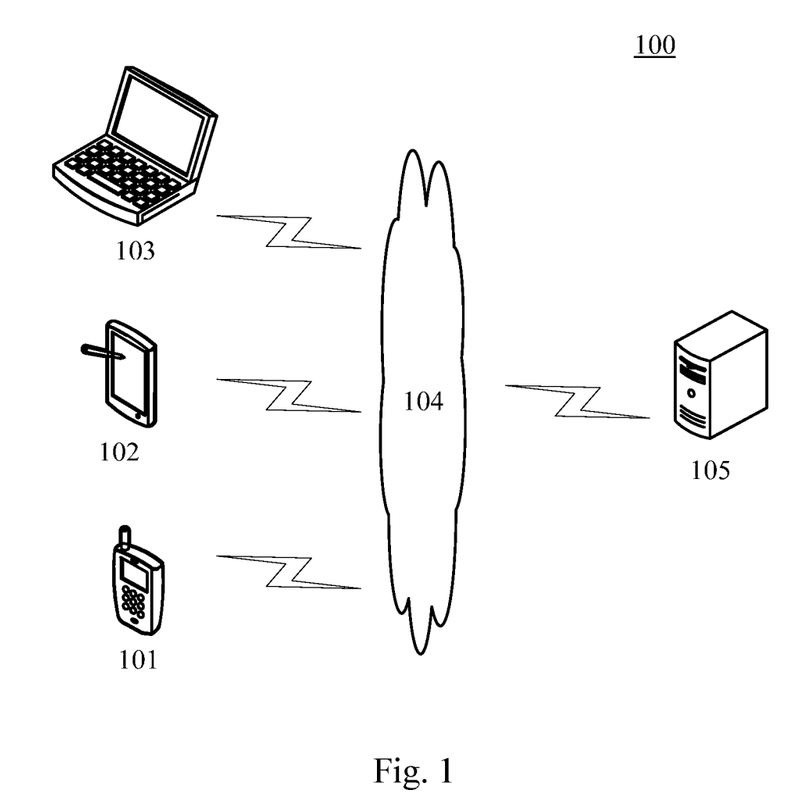
FIG. 1 is an exemplary system architecture diagram in which an embodiment of the present disclosure may be applied.

FIG. 1 illustrates an exemplary system architecture 100 in which a method for generating information or an apparatus for generating information of embodiments of the present disclosure may be applied.

As shown in FIG. 1, the system architecture 100 may include terminal devices 101, 102, 103, a network 104, and a server 105. The network 104 serves as a medium for providing a communication link between the terminal devices 101, 102, 103 and the server 105. Network 104 may include various types of connections, such as wired, wireless communication links, fiber optic cables, or the like.

The user may interact with the server 105 through the network 104 using the terminal devices 101, 102, 103 to receive or send messages, etc. Various communication client applications such as a web browser application, a news application, a shopping application, a search application, an instant messaging tool, a mailbox client, and social platform software may be installed on the terminal devices 101, 102, and 103.

The terminal devices 101, 102, 103 may be hardware or software. When the terminal devices 101, 102, 103 are hardware, they may be various electronic devices having a display screen and supporting information browsing, including but not limited to a smartphone, a tablet computer, an electronic book reader, a laptop computer, a desktop computer, and the like. When the terminal devices 101, 102, and 103 are software, they may be installed in the electronic devices listed above. It may be implemented as a plurality of pieces of software or software modules (e.g., for providing distributed services) or as a single piece of software or software module. It is not specifically limited herein.

The server 105 may be a server providing various services, such as a background server providing support for information displayed on the terminal devices 101, 102, 103. A push system may run on the background server, and the push system may push information to the terminal devices 101, 102, 103.

It should be noted that the server 105 may be hardware or software. When the server 105 is hardware, it may be implemented as a distributed server cluster of multiple servers, or it may be implemented as a single server. When the server 105 is software, it may be implemented as a plurality of pieces of software or software modules (e.g., for providing distributed services), or it may be implemented as a single piece of software or software module. It is not specifically limited herein.

It should be noted that the method for generating information provided in the embodiments of the present disclosure may be executed by the terminal devices 101, 102, and 103, or may be executed by the server 105. Accordingly, the apparatus for generating information may be provided in the terminal devices 101, 102, 103, or may be provided in the server 105.

It should be understood that the number of terminal devices, networks and servers in FIG. 1 is merely illustrative. There may be any number of terminal devices, networks, and servers as desired for implementation.

Figure 2:
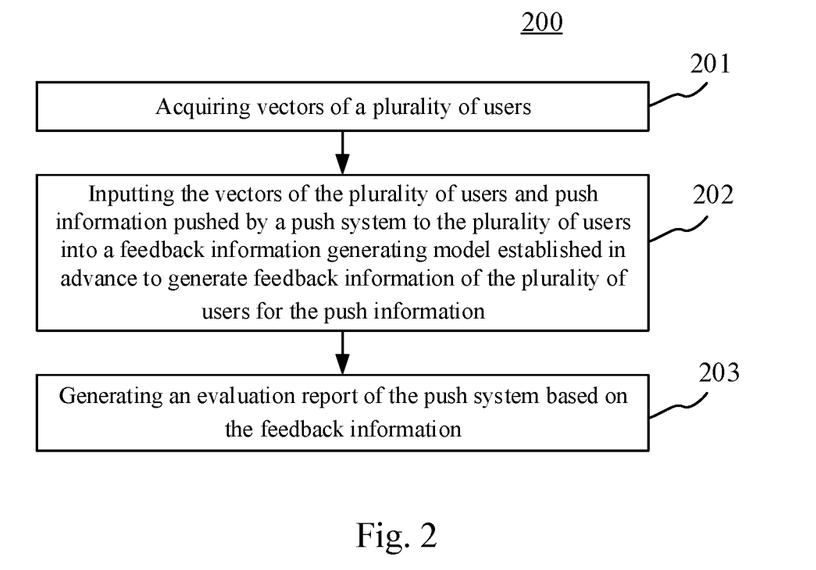
FIG. 2 is a flowchart of a method for generating information according to an embodiment of the present disclosure.

With continuing reference to FIG. 2, a flow 200 of a method for generating information in accordance with an embodiment of the present disclosure is shown. The method for generating information according to the embodiment of the present embodiment includes the following steps.

Step 201, acquiring vectors of a plurality of users.

In the present embodiment, the executing body of the method for generating information (for example, the server 105 shown in FIG. 1) may acquire vectors of a plurality of users through a wired connection or a wireless connection. The vectors may be used to characterize the behavior habits of the user. The users may be users registered on any website or application that can push information. The website or application may be supported by a device running the push system. The executing body may obtain the vectors of the plurality of users locally, or obtain the vectors of the plurality of users from other electronic devices.

In some alternative implementations of the present embodiment, the vectors of the users may be obtained by the following steps not shown in FIG. 2: for each user, obtaining historical behavior data of the user; processing the historical behavior data to obtain a vector of the user.

In the present implementation, the executing body may first acquire historical behavior data of each user. The historical behavior data includes historical behavior data generated by a user on a website or an application program, for example, a page address directly requested by the user and a recommended content page address requested by the user. The page address directly requested by the user refers to a page address accessed by the user according to the personal will of the user without any prompt or recommendation. The recommended content page address requested by the user refers to the page address recommended by the server according to the user's preference after the user receives the recommended content. The executing body may process the historical behavior data to obtain a vector of the user. Specifically, the executing body may classify the information to which the historical behavior data is directed, determine a label of the user, and then determine a vector corresponding to the user according to a preset mapping relationship between the label and the vector. Alternatively, the executing body may process the historical behavior data using various data processing algorithms to obtain a corresponding vector. The data processing algorithms include, but are not limited to, a hash algorithm, a compression algorithm, and the like.

It will be appreciated that the characteristics of the user can be unequivocally understood by the executing body by means of a tag-determined vector, and this tag-determined vector may be referred to as an explicit vector. For a vector obtained by processing historical behavior data by a data processing algorithm, the executing body does not know the characteristics of the user, and this vector may be referred to as an implicit vector.

Step 202, inputting the vectors of the plurality of users and push information pushed by a push system to the plurality of users into a feedback information generating model established in advance to generate feedback information of the plurality of users for the push information.

after obtaining the vectors of the plurality of users, the executing body may further obtain a plurality of pieces of push information pushed by the push system to the plurality of users. In the present embodiment, the push system may be a system for recommending information that may be of interest to a user through information statistics, calculation, filtering, or the like, and may include a plurality of modules, each of the modules is responsible for a different process, and the modules are interlinked to implement pushing of information. It will be appreciated that the plurality of pieces of push information are to be pushed by the push system to the plurality of users. The plurality of pieces of push information may be the same or different. The executing body may input the vectors of the plurality of users and the plurality of pieces of push information into a feedback information generating model established in advance, respectively. The feedback information generating model is used to represent a corresponding relationship between the vector, the push information, and the feedback information. The feedback information generating model may be constructed by various machine algorithms, such as a convolutional neural network. The feedback information may include various feedback on the push information, such as whether to click, browse duration, direct evaluation and scoring of the recommendation information, and the like.

Step 203: generating an evaluation report of the push system based on the feedback information.

After receiving the feedback information, the executing body may generate an evaluation report for the push system. Specifically, the executing body may analyze the feedback information to determine positive feedback information and negative feedback information therein. The positive feedback information is a feedback made when the user approves the information pushed by the push system, and the negative feedback information is a feedback made when the user does not approve the information pushed by the push system. The executing body may generate an evaluation report based on the positive feedback information and the negative feedback information. Specifically, the evaluation report may include the positive feedback information and the negative feedback information, or the evaluation report may further include a module for which the positive feedback information is targeted and a module for which the negative feedback information is targeted. The executing body may output the generated evaluation report, and the technician may further process (such as go online or optimize) the push system according to the evaluation report.

In some alternative implementations of the present embodiment, the method may further include the following step not shown in FIG. 2: optimizing the push system based on the evaluation report.

In the present implementation, the executing body may optimize the push system based on the evaluation report. Specifically, the executing body may determine at least one module generating the negative feedback information according to the negative feedback information in the feedback information, and then optimize the at least one module.

Figure 3:
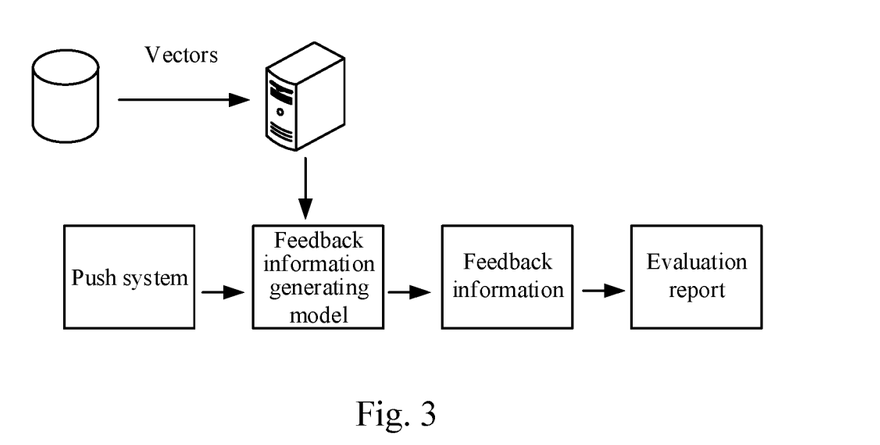
FIG. 3 is a schematic diagram of an application scenario of a method for generating information according to an embodiment of the present disclosure.

With continued reference to FIG. 3, FIG. 3 is a schematic diagram of an application scenario of a method for generating information according to the present embodiment. In the application scenario of FIG. 3, the server first obtains vectors of a plurality of users from a database. Then, the vectors of the plurality of users and the push information pushed by the push system to the users are input into a feedback information generating model to obtain the feedback information. Finally, based on the feedback information, an evaluation report is generated. If the evaluation report considers that the push system is qualified, the push system will go online for use by the user.

According to the method for generating information provided in the embodiment of the present disclosure, the push system can be evaluated according to feedback information of a plurality of users generated by simulation, so that the evaluation accuracy of the push system is improved, and the cost is saved at the same time.

Figure 4:
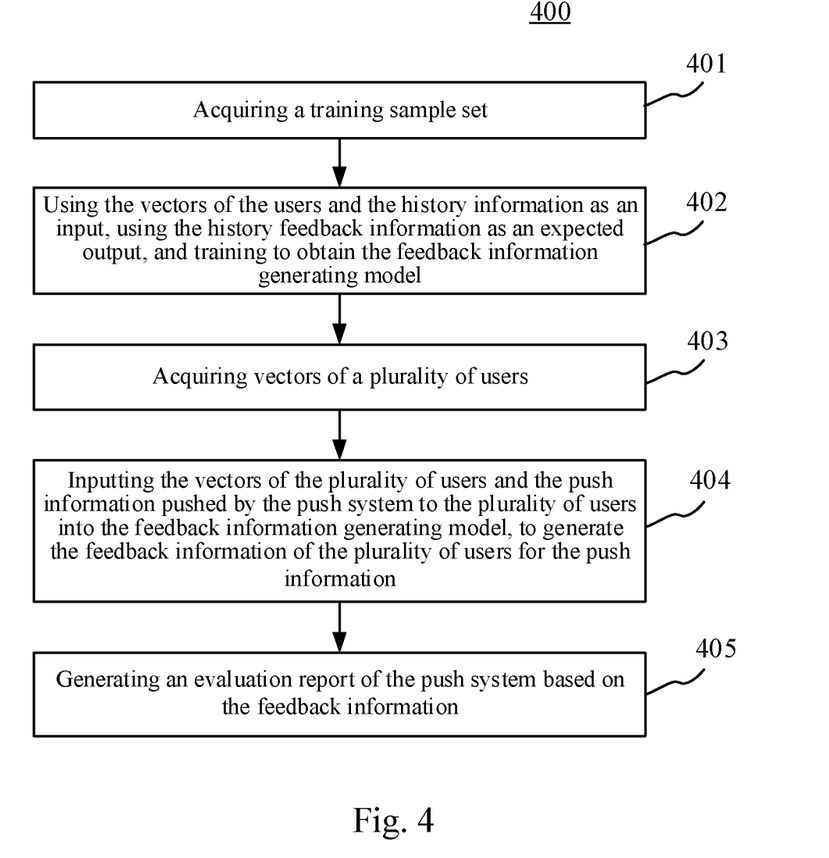
FIG. 4 is a flowchart of a method for generating information according to another embodiment of the present disclosure.

With continuing reference to FIG. 4, FIG. 4 shows a flow 400 of a method for generating information according to another embodiment of the present disclosure. As shown in FIG. 4, the method for generating information in the present embodiment may include the following steps.

Step 401: acquiring a training sample set.

In this embodiment, the training samples in the training sample set include vectors of users, historical information pushed to the users, and historical feedback information of the users for the historical information. The history information may include various types of information, such as news, entertainment, and the like. Specifically, the executing body may select a training sample set including different types of historical information according to an application scenario of the push system. For example, when the application scenario of the push system is a bank, the executing body may acquire a training sample set including historical information of a financial management type.

Step 402, using the vectors of the users and the history information as an input, using the history feedback information as an expected output, and training to obtain the feedback information generating model.

After acquiring the training sample set, the executing body may use the vectors of the users in the training sample and the history information as an input, and use the history feedback information as an expected output to train to obtain the feedback information generating model.

Step 403, acquiring vectors of a plurality of users.

Step 404: inputting the vectors of the plurality of users and the push information pushed by the push system to the plurality of users into the feedback information generating model, to generate the feedback information of the plurality of users for the push information.

Step 405: generating an evaluation report of the push system based on the feedback information.

The principles of steps 403~405 are similar to that of steps 201~203, and details thereof are not described herein.

According to the method for generating information provided in the embodiment of the present disclosure, the feedback information generating model may be trained according to the application scenario of the push system, thereby improving the accuracy of the feedback information generating model.

Figure 5:
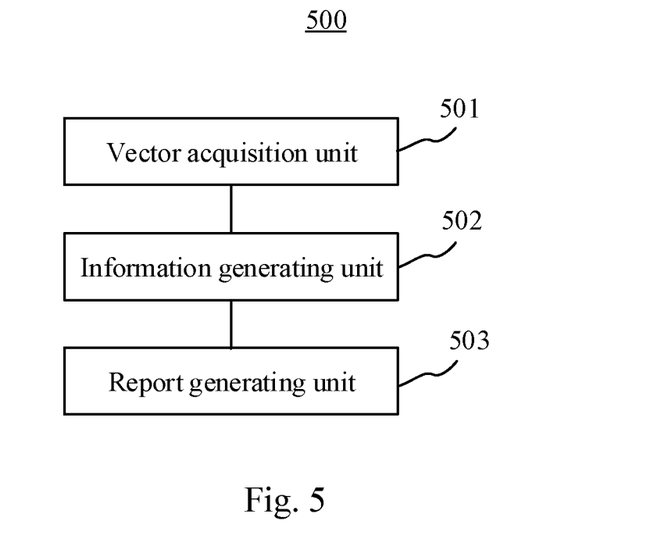
FIG. 5 is a schematic structural diagram of an apparatus for generating information according to an embodiment of the present disclosure.

With further reference to FIG. 5, as an implementation of the method shown in the above figures, an embodiment of the present disclosure provides an apparatus for generating information, the apparatus embodiment corresponds to the method embodiment shown in FIG. 2, and the apparatus is particularly applicable to various electronic devices.

As shown in FIG. 5, the apparatus 500 for generating information in the present embodiment includes a vector acquisition unit 501, an information generating unit 502, and a report generating unit 503.

The vector acquisition unit 501 is configured to acquire vectors of a plurality of users. The vectors are used to characterize behavior habits of the users.

The information generating unit 502 is configured to input the vectors of the plurality of users and the push information pushed by the push system to the plurality of users into a feedback information generating model established in advance, and generate the feedback information of the plurality of users for the push information. The feedback information generating model is used to represent a corresponding relationship between the vectors, the push information and the feedback information.

The report generating unit 503 is configured to generate an evaluation report of the push system based on the feedback information.

In some alternative implementations of the present embodiment, the vector acquisition unit 501 is further configured to: for each user, acquire historical behavior data of the user; and process the historical behavior data to obtain a vector of the user.

In some alternative implementations of the present embodiment, the apparatus 500 may further include a system optimizing unit (not shown in FIG. 5), configured to optimize the push system based on the evaluation report.

In some alternative implementations of the present embodiment, the apparatus 500 may further include a training unit (not shown in FIG. 5), configured to: acquire a training sample set, the training samples including vectors of users, historical information pushed to the users, and historical feedback information of the users for the historical information; use the vectors of the users and the history information as an input, use the history feedback information as an expected output, and train to obtain the feedback information generating model.

It should be understood that the units 501 to 503 described in the apparatus 500 for generating information correspond to the respective steps in the method described with reference to FIG. 2, respectively. Thus, the operations and features described above with respect to the method for generating information are also applicable to the apparatus 500 and the units contained therein, which will not be repeated herein.

Figure 6:
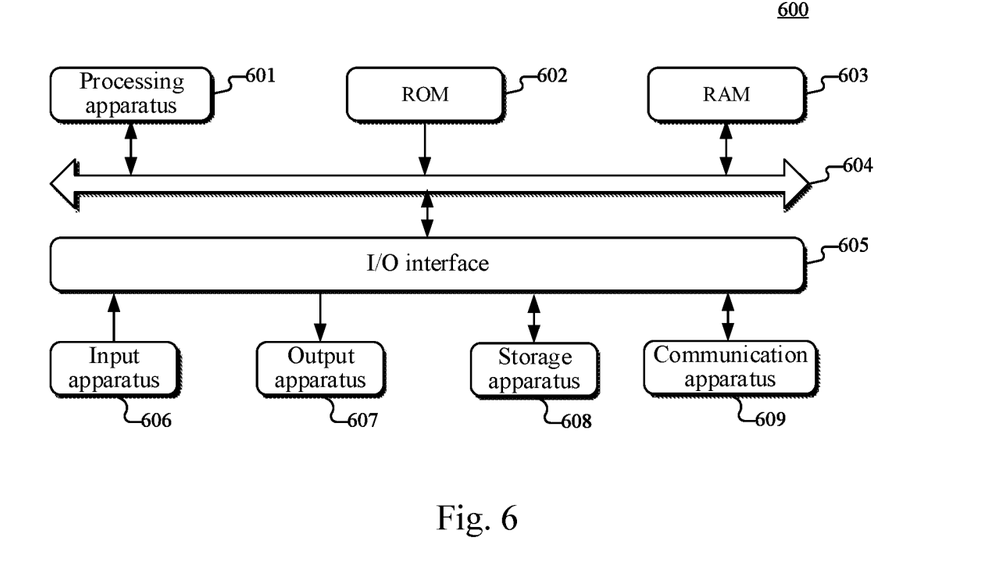
FIG. 6 is a schematic structural diagram of a computer system suitable for implementing an electronic device according to an embodiment of the present disclosure.

Referring to FIG. 6, FIG. 6 is a schematic structural diagram of an electronic device (e.g., the server or terminal device shown in FIG. 1) 600 adapted to implement embodiments of the present disclosure. The electronic device shown in FIG. 6 is merely an example, and should not bring any limitations to the functions and the scope of use of the embodiments of the present disclosure.

As shown in FIG. 6, the electronic device 600 may include a processing apparatus (e.g., a central processing unit, a graphics processor, or the like) 601, which may perform various appropriate actions and processes according to a program stored in a read-only memory (ROM) 602 or a program loaded from a storage device 608 into a random access memory (RAM) 603. In the RAM 603, various programs and data required for operation of the electronic device 600 are also stored. The processing apparatus 601, ROM 602 and RAM 603 are connected to each other via a bus 604. An input/output (I/O) interface 605 is also connected to bus 604.

Generally, the following devices may be connected to the I/O interface 605: An input apparatus 606 including, for example, a touch screen, a touchpad, a keyboard, a mouse, a camera, a microphone, an accelerometer, a gyroscope, or the like; An output apparatus 607 including, for example, a liquid crystal display (LCD), a speaker, a vibrator, or the like; A storage apparatus 608 including, for example, a magnetic tape, a hard disk, and the like; And a communication apparatus 609. Communication apparatus 609 may allow electronic device 600 to wirelessly or wirelessly communicate with other devices to exchange data. Although FIG. 6 illustrates an electronic device 600 having various devices, it should be understood that it is not required to implement or possess all of the illustrated apparatuses. More or fewer devices may alternatively be implemented or provided. Each block shown in FIG. 6 may represent one apparatus or multiple apparatus as desired.

In particular, according to embodiments of the present disclosure, the process described above with reference to the flow chart may be implemented in a computer software program. For example, an embodiment of the present disclosure includes a computer program product, which includes a computer program that is tangibly embedded in a machine-readable medium. The computer program includes program codes for executing the method as illustrated in the flow chart. In such an embodiment, the computer program may be downloaded and installed from a network via the communication apparatus 609, or may be installed from the storage apparatus 608, or may be installed from the ROM 602. The computer program, when executed by the processing apparatus 601, implements the functions as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any tangible medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The computer readable medium may be the computer readable medium included in the electronic device, or a stand-alone computer readable medium not assembled into the electronic device. The computer readable medium carries one or more programs. The one or more programs, when executed by the electronic device, cause the electronic device to: acquire vectors of a plurality of users, the vectors being used to characterize behavior habits of the users; input the vectors of the plurality of users and push information pushed by a push system to the plurality of users into a feedback information generating model established in advance to generate the feedback information of the plurality of users for the push information, the feedback information generating model being used to characterize a corresponding relationship between the vectors, the push information, and the feedback information; and generate an evaluation report of the push system based on the feedback information.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including a vector acquisition unit, an information generating unit, and a report generating unit. Here, the names of these units do not in some cases constitute a limitation to such units themselves. For example, the vector acquisition unit may also be described as "a unit configured to acquire vectors of a plurality of users, the vectors being used to characterize behavior habits of the users."

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for generating information, comprising:
acquiring vectors of a plurality of users, the vector being used to characterize behavior habits of the users;
inputting the vectors of the plurality of users and push information pushed by a push system to the plurality of users into a feedback information generating model established in advance, to generate the feedback information of the plurality of users for the push information, wherein the feedback information generating model is used to characterize a corresponding relationship between the vectors, the push information and the feedback information, wherein the feedback information generating model is trained by:
acquiring a training sample set, the training sample set including vectors of users, historical information pushed to the users, and historical feedback information of the users for the historical information; and
training the feedback information generating model by using the vectors of the users and the history information as an input, and by using the history feedback information as an expected output, wherein the historical feedback information comprises a first historical feedback indicating a browse duration of the pushing information, and a second historical feedback indicating whether to click the push information; and
generating an evaluation report of the push system based on the feedback information, wherein the evaluation report includes positive feedback information and negative feedback information.

2. The method of claim 1, wherein the acquiring vectors of a plurality of users comprises:
for each user, acquiring historical behavior data of the user; and
processing the historical behavior data to obtain a vector of the user.

3. The method of claim 1, further comprising:
optimizing the push system based on the evaluation report.

4. An apparatus for generating information, comprising:
at least one processor; and
a memory storing instructions, wherein the instructions when executed by the at least one processor, cause the at least one processor to perform operations, the operations comprising:
　acquiring vectors of a plurality of users, the vectors being used to characterize behavior habits of the users;
　inputting the vectors of the plurality of users and push information pushed by a push system to the plurality of users into a feedback information generating model established in advance to generate the feedback information of the plurality of users for the push information, the feedback information generating model being used to characterize a corresponding relationship between the vectors, the push information, and the feedback information, wherein the feedback information generating model is trained by:
　　acquiring a training sample set, the training sample set including vectors of users, historical information pushed to the users, and historical feedback information of the users for the historical information; and
　　training the feedback information generating model by using the vectors of the users and the history information as an input, and by using the history feedback information as an expected output, wherein the historical feedback information comprises a first historical feedback indicating a browse duration of the pushing information, and a second historical feedback indicating whether to click the push information; and
　generating an evaluation report of the push system based on the feedback information, wherein the evaluation report includes positive feedback information and negative feedback information.

5. The apparatus of claim 4, wherein the acquiring vectors of a plurality of users comprises:
　for each user, acquiring historical behavior data of the user; and
　processing the historical behavior data to obtain a vector of the user.

6. The apparatus of claim 4, wherein the operations further comprise:
　optimizing the push system based on the evaluation report.

7. A non-transitory computer readable medium, storing a computer program thereon, wherein the program, when executed by a processor, causes the processor to perform operations, the operations comprising:
　acquiring vectors of a plurality of users, the vectors being used to characterize behavior habits of the users;
　inputting the vectors of the plurality of users and push information pushed by a push system to the plurality of users into a feedback information generating model established in advance to generate the feedback information of the plurality of users for the push information, the feedback information generating model being used to characterize a corresponding relationship between the vectors, the push information, and the feedback information, wherein the feedback information generating model is trained by:
　　acquiring a training sample set, the training sample set including vectors of users, historical information pushed to the users, and historical feedback information of the users for the historical information; and
　　training the feedback information generating model by using the vectors of the users and the history information as an input, and by using the history feedback information as an expected output, wherein the historical feedback information comprises a first historical feedback indicating a browse duration of the pushing information, and a second historical feedback indicating whether to click the push information; and
　generating an evaluation report of the push system based on the feedback information, wherein the evaluation report includes positive feedback information and negative feedback information.

8. The non-transitory computer readable medium of claim 7, wherein the acquiring vectors of a plurality of users comprises:
　for each user, acquiring historical behavior data of the user; and
　processing the historical behavior data to obtain a vector of the user.

9. The non-transitory computer readable medium of claim 7, wherein the operations further comprise:
　optimizing the push system based on the evaluation report.

10. The method of claim 2, wherein the historical behavior data comprises a page address directly requested by the user and a recommended content page address requested by the user.

11. The method of claim 3, wherein the optimization comprises:
　determining at least one module generating the negative feedback information according to the negative feedback information; and
　optimizing the at least one module.

* * * * *